(12) United States Patent
Bertossi

(10) Patent No.: US 6,267,105 B1
(45) Date of Patent: Jul. 31, 2001

(54) ELECTRONIC PRESSURE REDUCER FOR LIQUID PETROLEUM GASSES

(76) Inventor: Bruno Bertossi, Via Dell'Industria 17, 33024 Tolmezzo (IT)

(*) Notice: Subject to any disclaimer, the term of this patent is extended or adjusted under 35 U.S.C. 154(b) by 0 days.

(21) Appl. No.: 09/332,485

(22) Filed: Jun. 14, 1999

(30) Foreign Application Priority Data

Jun. 12, 1998 (EP) .................................................. 98110798

(51) Int. Cl.[7] .................................................. F02M 21/02
(52) U.S. Cl. ..................................... 123/525; 123/27 GE
(58) Field of Search .................................... 123/525, 527, 123/529, 27 GE

(56) References Cited

U.S. PATENT DOCUMENTS

| | | |
|---|---|---|
| 4,141,326 | 2/1979 | Wolber . |
| 4,335,697 * | 6/1982 | McLean .............................. 123/527 |
| 4,492,208 | 1/1985 | Lent . |
| 4,541,397 * | 9/1985 | Young .............................. 123/527 |
| 4,742,801 | 5/1988 | Kelgard . |
| 4,909,209 * | 3/1990 | Takahasi ............................ 123/27 GE |
| 4,989,573 * | 2/1991 | Yokoyama et al. ............................ 123/527 |
| 5,010,868 * | 4/1991 | Clements ............................ 123/527 |
| 5,012,781 * | 5/1991 | Yokoyama et al. ............................ 123/353 |
| 5,025,758 * | 6/1991 | Djurdjevic ............................ 123/527 |
| 5,086,748 * | 2/1992 | Yokoyama ............................ 123/549 |
| 5,203,305 * | 4/1993 | Porter et al. ............................ 123/478 |
| 5,343,847 | 9/1994 | Chasteen . |
| 5,367,999 * | 11/1994 | King et al. ............................ 123/458 |
| 5,390,651 | 2/1995 | Nussbaum . |
| 5,483,943 * | 1/1996 | Peters ............................ 123/527 |

FOREIGN PATENT DOCUMENTS

| | | |
|---|---|---|
| 36 12 994 | 10/1987 | (DE) . |
| 0 661 428 | 7/1995 | (EP) . |
| 0 685 639 | 12/1995 | (EP) . |
| 98 11 0798 8 * | 6/1998 | (EP) . |
| 07 253051 | 10/1995 | (JP) . |
| 92 11448 | 7/1992 | (WO) . |
| 94 24433 | 10/1994 | (WO) . |

OTHER PUBLICATIONS

Patent Abstracts of Japan, vol. 96, No. 2, Feb. 29, 1996.
European Search Report, (attached) to Application #EP 98 11 0799, Nov. 12, 1998, by Examiner J. Joris.

* cited by examiner

Primary Examiner—Noah P. Kamen
Assistant Examiner—Hai Huynh
(74) Attorney, Agent, or Firm—Bradley Arant Rose & White, LLP

(57) ABSTRACT

An electronic pressure reducer for liquid petroleum gasses comprises a heat exchanger (2,3) located upstream of an evaporation chamber (4) connected to a pressure reducing valve (5); the chambers (13,14) of the reducing valve (5) are separated by a passage section (15) for the fuel in the state of superheated vapor; the area of the passage section (15) is changed by a conic closing device (16) manoeuvred by a step motor (17) controlled by the central unit (6); the control central unit (6) defines the displacement of the conic closing device (16) from a first position of maximum flow to a second position of minimum flow by changing the area of the passage section (15), the dimension of which defines the flow and the pressure of the fuel coming out of the reducing valve (5) through an outlet orifice (18) connected to a metering valve (10).

10 Claims, 7 Drawing Sheets

ELECTRONIC PRESSURE REDUCER FOR LIQUID PETROLEUM GASSES

BACKGROUND OF THE INVENTION

The present invention relates to a pressure reducer for internal combustion engines fed with liquid petroleum gasses; the reducer essentially comprises a valve for intercepting the liquid petroleum gas flow, a heat exchanger consisting of a first section in which the liquid gas is heated by means of the heat of the engine cooling water and a second section for heating the liquid gas with electrical resistors, an evaporation chamber, a device for regulating the gas pressure, an electronic central for controlling said pressure, gas absolute pressure sensors located at the outlet of the device for regulating the gas pressure, pressure sensors in the intake manifold of the engine and gas temperature sensors.

STATE OF THE TECHNIQUE

EP-A-0 526 410 refers to self-compensated and electrically heated reducer for compressed gas or l.p.g.

The reducer comprises: a supporting body, a chamber formed inside the body; a diaphragm; an opening inlet between an entrance and the chamber; a closing mechanism for an opening inlet controlling the flow of fuel owing to the action of manoeuvring elements, mechanically connected to the diaphragm, on the device controlling the fuel pressure coming out of the bottle; a mechanism which acts on at least one of the manoeuvring elements to cancel the resultant of the action of the fuel pressure on the mechanism; electrical resistors connected with the feeding system in the engine placed in thermal contact with the walls of the body near the inlet.

In this and other available prior art documents pressure reducers are described which mainly present the following disadvantages:

A—The pressure is reduced by means of mechanical apparatuses, preferably fitted with diaphragms; in these apparatuses devices are not provided which verify if the fuel pressure has been reduced to the optimal value for feeding the engine;

B—The diaphragms are used both in the first stage of the reducer for obtaining a first pressure reduction from the value reached after the vaporisation to the outlet value from the first stage, and in the second stage for a second pressure reduction from the outlet value from the first stage to a value allowing the feeding of the engine;

C—The engine feeding pressure depends on both the first and second reduction effected, respectively, by the diaphragms of the first and the second stage; since the diaphragm of the first stage is not capable of reducing the gas pressure from the vaporisation value to a convenient outlet value from the first stage with precision and reproducibility, the feeding pressure is subject to errors depending on the errors of the diaphragm of the first stage;

D—The heat exchangers used for vaporising the fuel consist of electrical resistors placed in thermal contact with the walls of the first stage body near the inlet of the second stage; therefore, their function is limited to heating the fuel during the engine warm up; in the subsequent engine working phases at stabilised temperature, during which the heating can be the cause for a greater evaporation efficiency, the known heat exchangers do not work.

AIMS AND FEATURES OF THE INVENTION

The purpose of this invention is to obviate these disadvantages.

The invention, as claimed, solves the problem of creating an electronic pressure reducer for liquid petroleum gasses. The reducer is fitted with a first stage in which a reducing valve is found for reducing the fuel pressure from the vaporisation value to an outlet value from the first stage; the pressure reducing valve is controlled by a central unit with electronic components in order to obtain pressure values suitable for the different working phases of the engine at the outlet of the first stage with reproducibility.

The advantages reached by using the reducer according to the invention are mainly due to the fact that a heat exchanger is located upstream of the entrance of the first stage so that the fuel is heated before entering the first stage; this particularity of the reducer allows a greater evaporation efficiency than the efficiency reached by the reducer disclosed by EP-A-0 526 410, in which a heat exchanger is used consisting of electrical resistors placed in thermal contact with the walls of the body near the inlet orifice of the second stage.

BRIEF DESCRIPTION OF THE DRAWINGS

Other advantages, features and aims of the invention may be more readily understood by referring to the accompanying drawings, which concern preferred embodiments, in which.

DESCRIPTION OF PREFERRED EMBODIMENTS OF THE INVENTION

Figure 1:
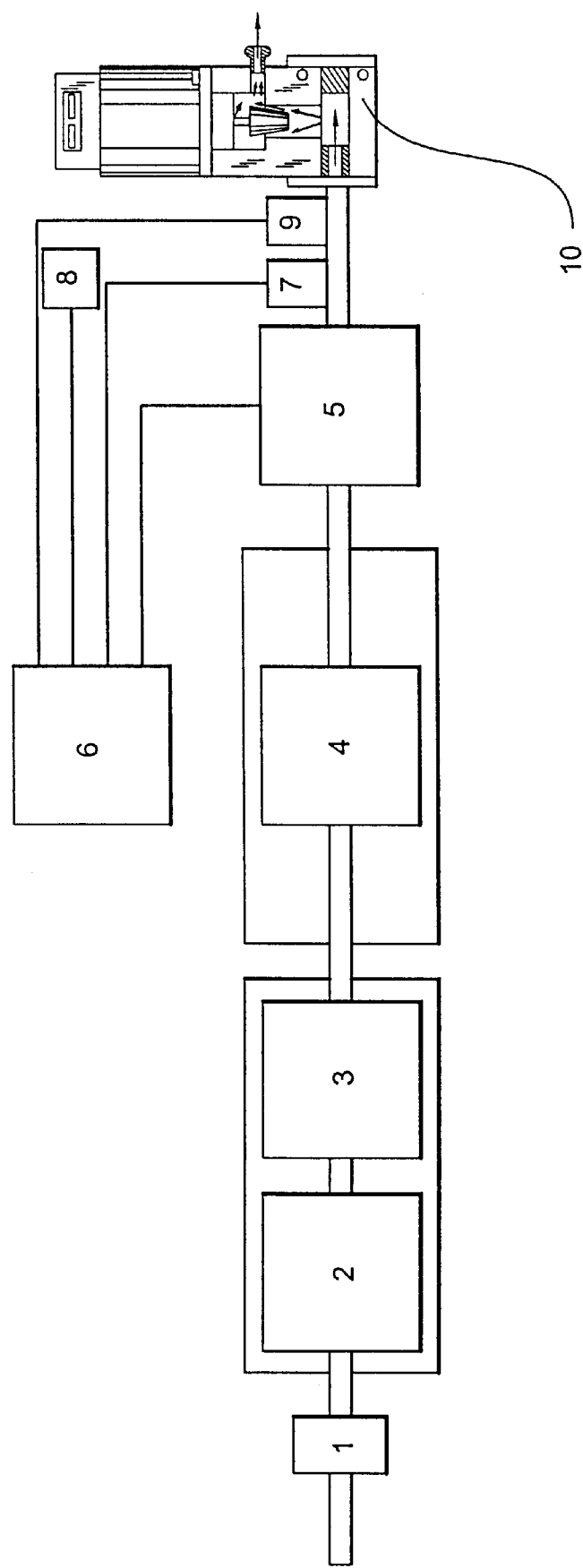
FIG. 1 is a block diagram of the control system of the reducer according to the present invention.

The block diagram of FIG. 1 shows a control system of the reducer in which a solenoid valve 1 intercepting the liquid fuel is jointed to a bottle (not shown in this figure).

The solenoid valve 1 is connected to a first stage 2 of a heat exchanger in which the heat to be transmitted to the liquid fuel is provided by the engine cooling water.

A second stage 3 of the heat exchanger is connected in series to the first stage 2; in the second stage 3 the heat to be transmitted to the liquid fuel is provided by electrical resistors fed by the engine battery; the outlet of the heat exchanger 2, 3 flows into a chamber 4 in which the fuel evaporation takes place thanks to the heat absorbed during the passage through the stages 2, 3; the fuel in the state of dry saturated vapour enters a pressure reducing valve 5, in which the pressure of the evaporated gas is regulated considering the engine working state; the pressure reducing valve 5 flows into a metering valve 10 of the type described in the European Patent Application No. 97103705.6.

The fuel in the state of superheated vapour crosses the pressure reducing valve 5 where it undergoes a thermodynamic process which causes an expansion and a fall of temperature; it is, therefore, necessary that the heat exchanger 2, 3 supplies an amount of heat to the liquid fuel for preventing condensation phenomena and eventual frosting in the throttling of the pressure reducing valve 5.

The pressure reducing valve 5 is controlled by a central unit 6 fitted with electronic components jointed to sensors 7 of the absolute pressure at the outlet of the pressure reducing valve 5, a pressure sensor 8 inserted in the engine intake manifold and a temperature sensor 9 situated at the outlet of the system of FIG. 1 (valve 5).

The solenoid on-off valve 1 at the outlet of the bottle is open only when the engine is fed with gaseous fuel.

The stages 2, 3 connected in series form a heat exchanger with two stages which delivers the amount of heat necessary for the evaporation of the l.p.g. considering the pressure of the liquid fuel at the entrance of the same stages.

The stage 2 delivers the heat supplied by the engine cooling water to the liquid fuel; during the engine warm-up, the heat of the cooling water is insufficient for evaporating the liquid fuel, therefore, it is necessary to supply heat by means of other devices, for example, electrical resistors which deliver thermal energy for Joule effect.

Preferably, the resistors used in the stage 3 are PTC resistors, the resistivity of which decreases with the increase of the temperature. The still cold liquid fuel is heated by these resistors connected to the engine battery. The resistors progressively increase their resistivity with the increasing of the temperature and, when the fuel and the cooling water are sufficiently heated, the resistors deliver an amount of heat negligible with respect to the amount of heat transmitted to the fuel by the cooling water crossing the stage 2.

In a not shown embodiment a series of resistors is used, the resistors being connected to the control central unit 6; the resistors transmit an amount of heat to the fuel gradually decreasing with the increase of the engine temperature measured by the sensor 9 located at the outlet of the system of FIG. 1. It is possible to choose the resistors in order to obtain a constant outlet temperature independently from the fuel flow and pressure; this embodiment is used when the thermal parameters of the fuel must be strictly maintained under control.

The transmission of the heat from the electrical resistors (PTC or traditional) to the fuel occurs in the absence of oxygen.

By means of a suitable planning of the heat exchanger and the convenient components (electrical PTC or traditional resistors in combination or non with the water radiators) it is possible to obtain the aim of maintaining the gas at a pre-established constant temperature before the fuel pressure reduction.

The heat exchanger 2, 3 is located upstream of the evaporation chamber 4, in which the expansion of the fuel heated in the heat exchanger 2, 3 occurs. In said chamber 4 the fuel is in the state of dry saturated vapour and expands; this expansion causes a transformation at constant enthalpy of the fuel from dry saturated vapour to superheated vapour with a terminal pressure lower than the inlet fuel pressure entering the chamber 4.

The fuel pressure reducing valve 5 consists of a variable hydraulic resistance comprising a passage section for the superheated vapour; the area of the passage section is changed by a closing device manoeuvred by an actuator controlled by the central unit 6.

The control central unit 6 defines the manoeuvre of the closing device of the pressure reducing valve 5 considering the signals coming out of the sensors 7, 9 in order to obtain a pre-established fuel pressure value at the outlet of the valve 5, said value being stored in the control central unit 6.

The definition of the pre-established fuel pressure value allows to obtain a desired terminal value of the pressure. The fundamental difference in the working of this reducing valve with respect to the traditional mechanical valves of the first stage consists in the fact that the valve according to the invention allows a very precise and continuous adjusting of the pressure; therefore, the fuel feeding devices located downstream of the valve can work in the most correct way, said feeding devices being both single or multiple.

The pressure sensor 8 is connected to the control central unit 6 and detects the pressure in the engine intake manifold; according to the value of the signal of the pressure sensor 8 the control central unit 6 processes an operative signal for the actuator of the pressure reducing valve 5 to obtain a constant difference between the pressure in the intake manifold and the pressure at the outlet of the reducing valve 5. The pressure difference is more stable than the one obtained by means of the traditional reducers; in addition, the inertia and hysteresis phenomena and the response times to the variations of pressure diminish.

It is possible to obtain a pressure curve in function of time at the outlet of the reducing valve 5; the curve follows a pre-established law and is stored in the control central unit 6. Because of the characteristic of the curve and its storing in the control central unit 6 the reducer is particularly suitable for the engines with single feeding, i.e. with one feeding device for each combustion chamber. This advantage is not allowable by using traditional mechanical pressure reducers, since therein the outlet pressure is mainly determined by an adjusting spring, the prefixed calibration of cannot change during the different engine working phases.

Figure 2:
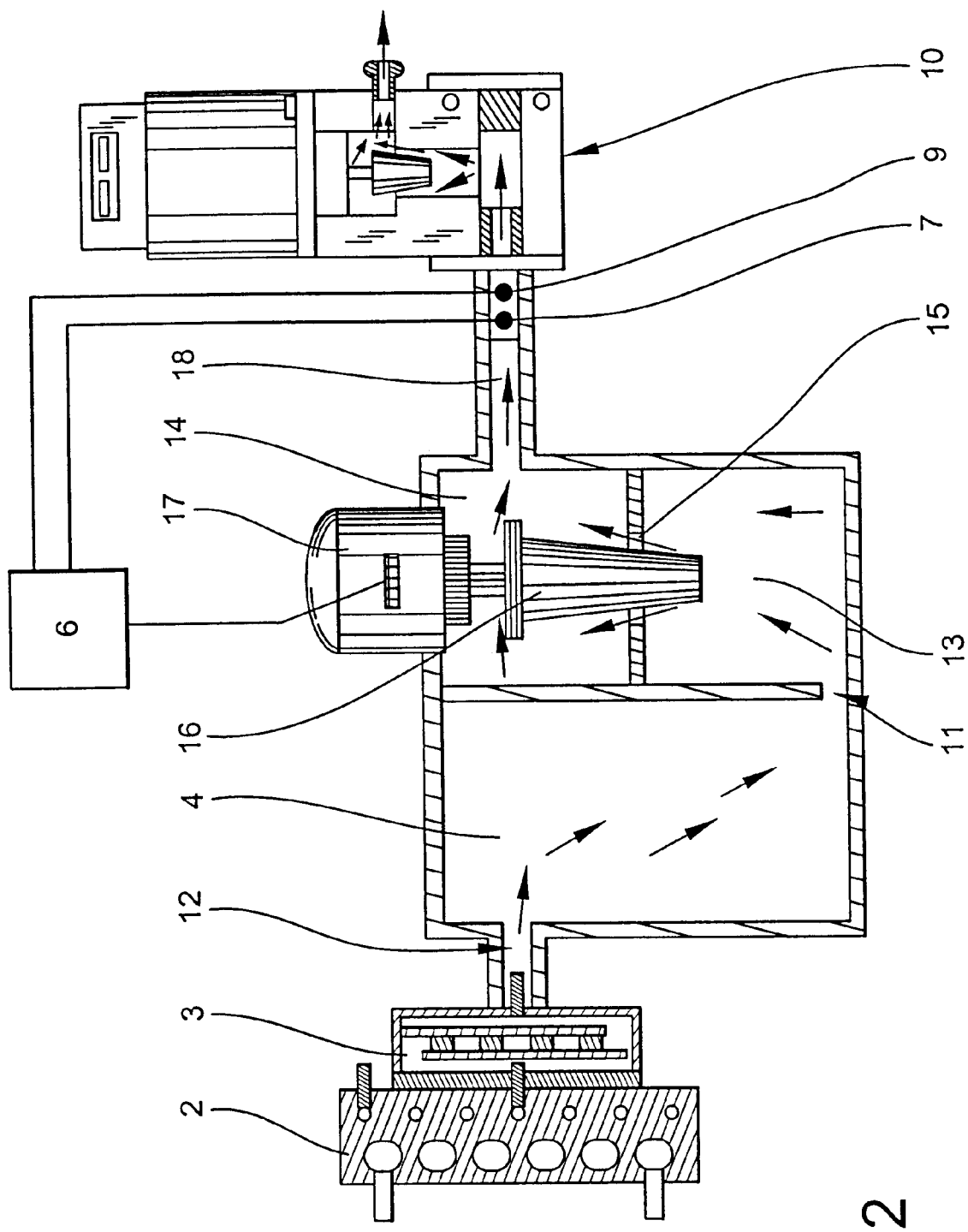
FIG. 2 shows a first embodiment of a pressure reducing valve provided in the reducer, the valve presenting a closing device in a first position.
Figure 3:
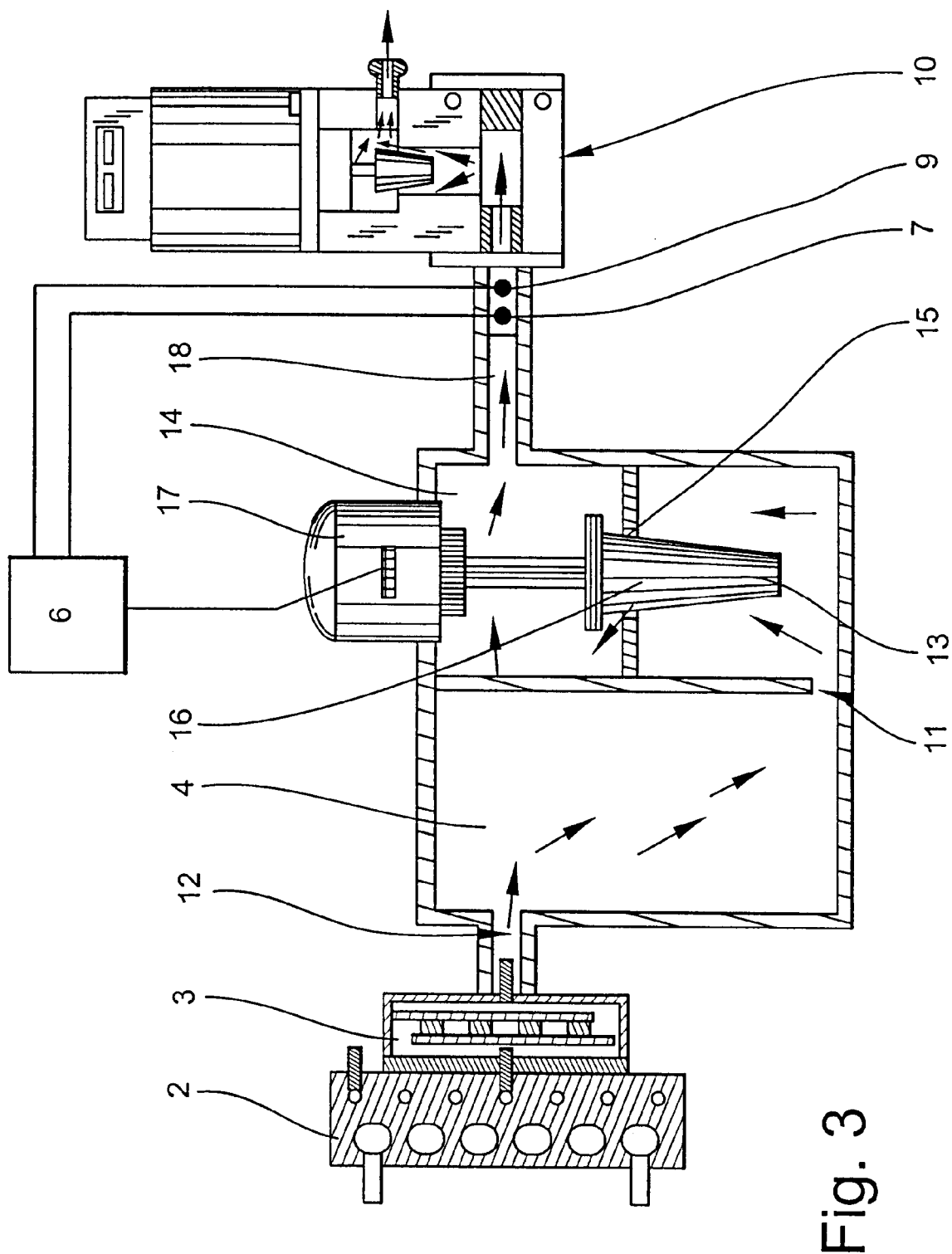
FIG. 3 shows the pressure reducing valve of FIG. 2 with the closing device in a second position.

The reducing valve 5 shown in FIGS. 2, 3 is connected to the evaporation chamber 4 of the fuel through a connecting orifice 11, while the evaporation chamber 4 is jointed to the heat exchanger 2, 3 through an inlet orifice 12. The reducing valve 5 consists of two chambers 13, 14 separated by a passage section 15 for the superheated vapour; the area of the passage section 15 is changed by a conic closing device 16 moved by a step motor 17 controlled by the central unit 6. The control central unit 6 defines the displacement of the conic closing device 16 from a first position of maximum flow shown in FIG. 2 to a second position of minimum flow illustrated in FIG. 3 by changing the area of the passage section 15, the dimension of which defines the flow and pressure of the fuel coming out of the valve 5 through an outlet orifice 18 connected to the metering valve 10.

Figure 4:
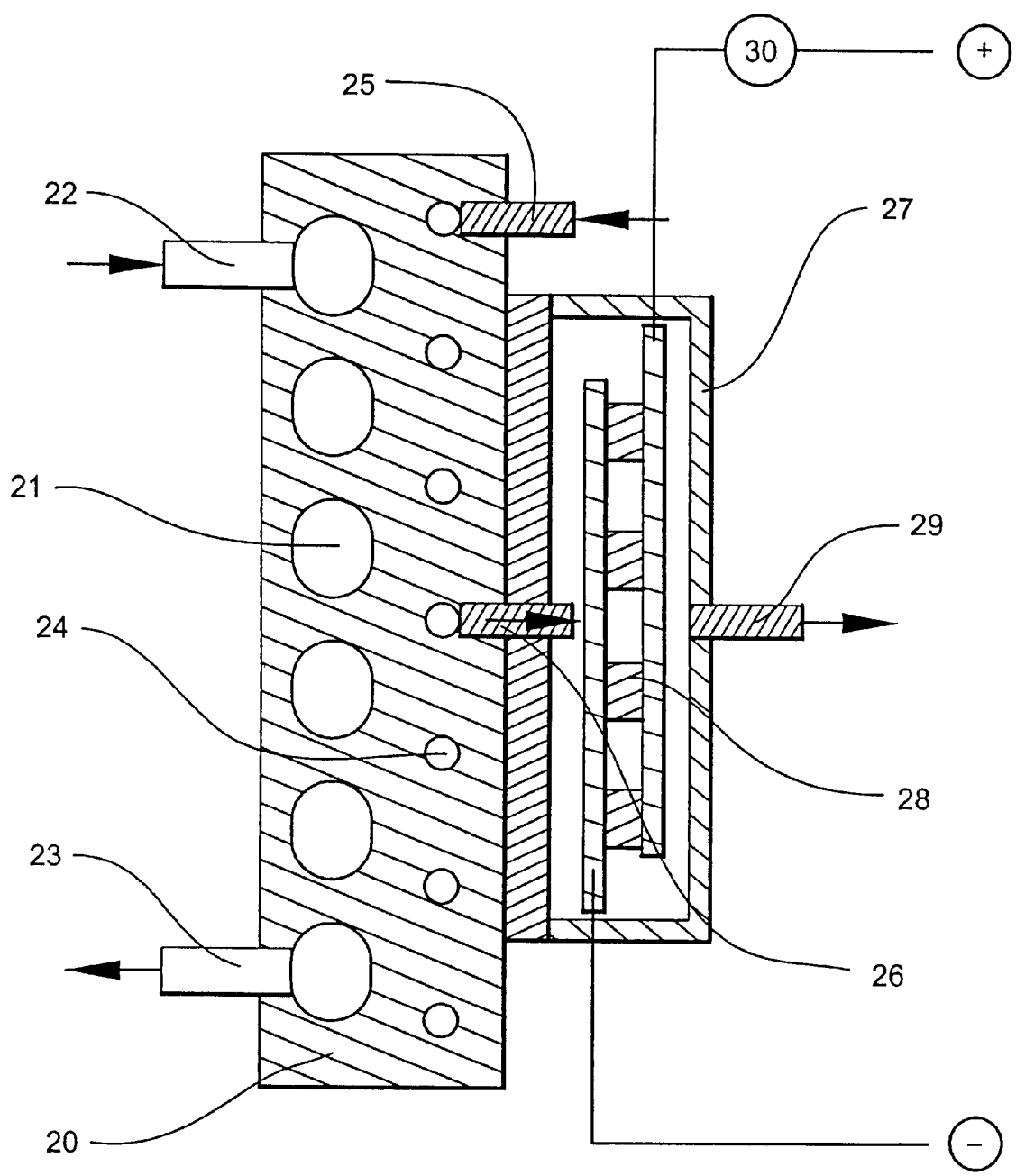
FIG. 4 schematically represents a heat exchanger used in the reducer.

The heat exchanger schematised in FIG. 4 comprises two stages 2, 3 disposed in series.

The stage 3 consists of a body 20 in which a first tube 21 is located, the tube 22 being crossed by the engine cooling water from an entrance 22 to an outlet 23. A second tube 24 housed inside the body 20 is crossed by the fuel coming out of a bottle (not shown) from an entrance 25 to an outlet 26. The outlet 26 of the second tube 24 flows into a gasproof box 27, in which a series of electrical resistors 28 is housed, the resistors 28 being connected to the engine battery (+, −); an outlet duct 29 of the box 27 flows into the evaporation chamber 4. A switch 30 is a component of the circuit of the resistors 28. The box 27 is gasproof so that the transmission of the heat to the fuel occurs in the absence of oxygen.

Figure 5:
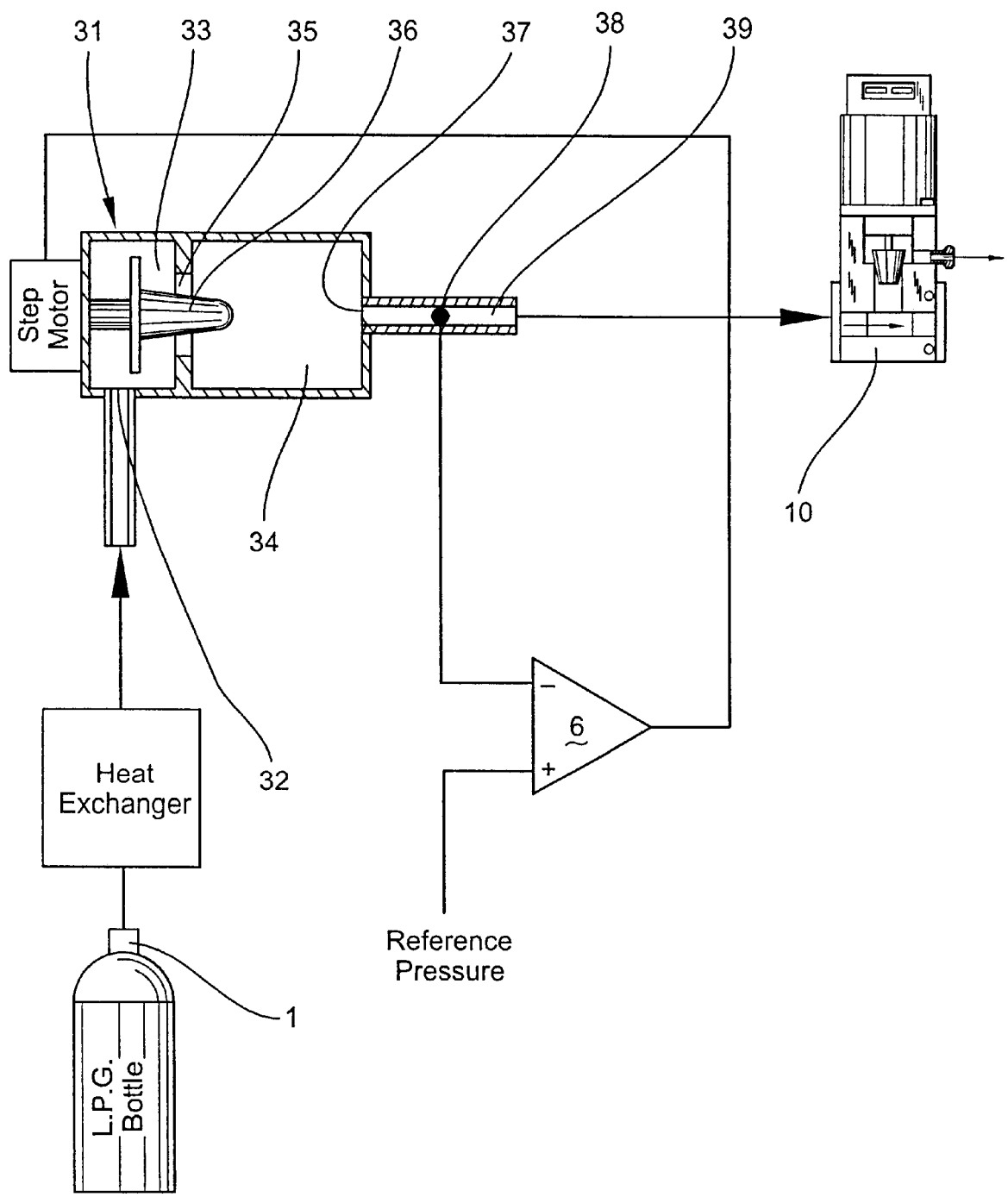
FIG. 5 is a block diagram of a second embodiment of the pressure reducing valve.

FIG. 5 is a block diagram of the system wherein a bottle for l.p.g. is fitted with a solenoid on-off valve 1 connected to the heat exchanger, the outlet duct of which flows into a pressure reducing valve 31 through an inlet orifice 32.

The reducing valve 31 consists of an evaporation chamber 33 and an expansion chamber 34 separated by a passage section 35 for the superheated vapour; the area of the passage section 35 is changed by a cigar-shaped point closing device 36 moved by a step motor controlled by the central unit 6.

A sensor 38 of the absolute pressure inserted in the outlet duct 39 of the reducing valve 31 is jointed to the control central unit 6. The control central unit 6 defines the displacement of the cigar-shaped point closing device 36 by changing the area of the passage section 35 according to the difference between the pressure measured by the sensor 38 and a pressure reference value stored in the control central unit 6.

Figure 6:
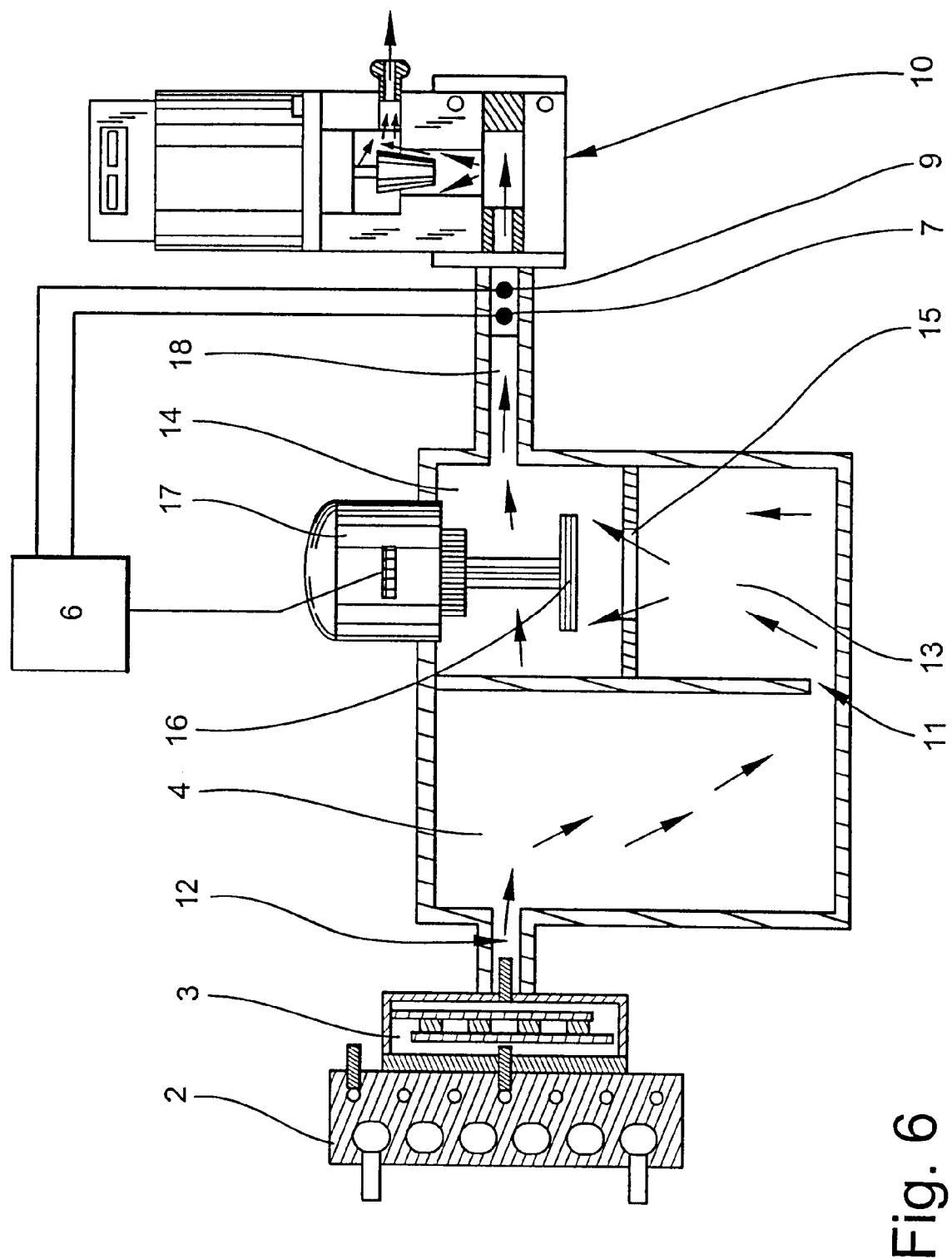
FIG. 6 shows a third embodiment of the pressure reducing valve with the closing device in a first position.
Figure 7:
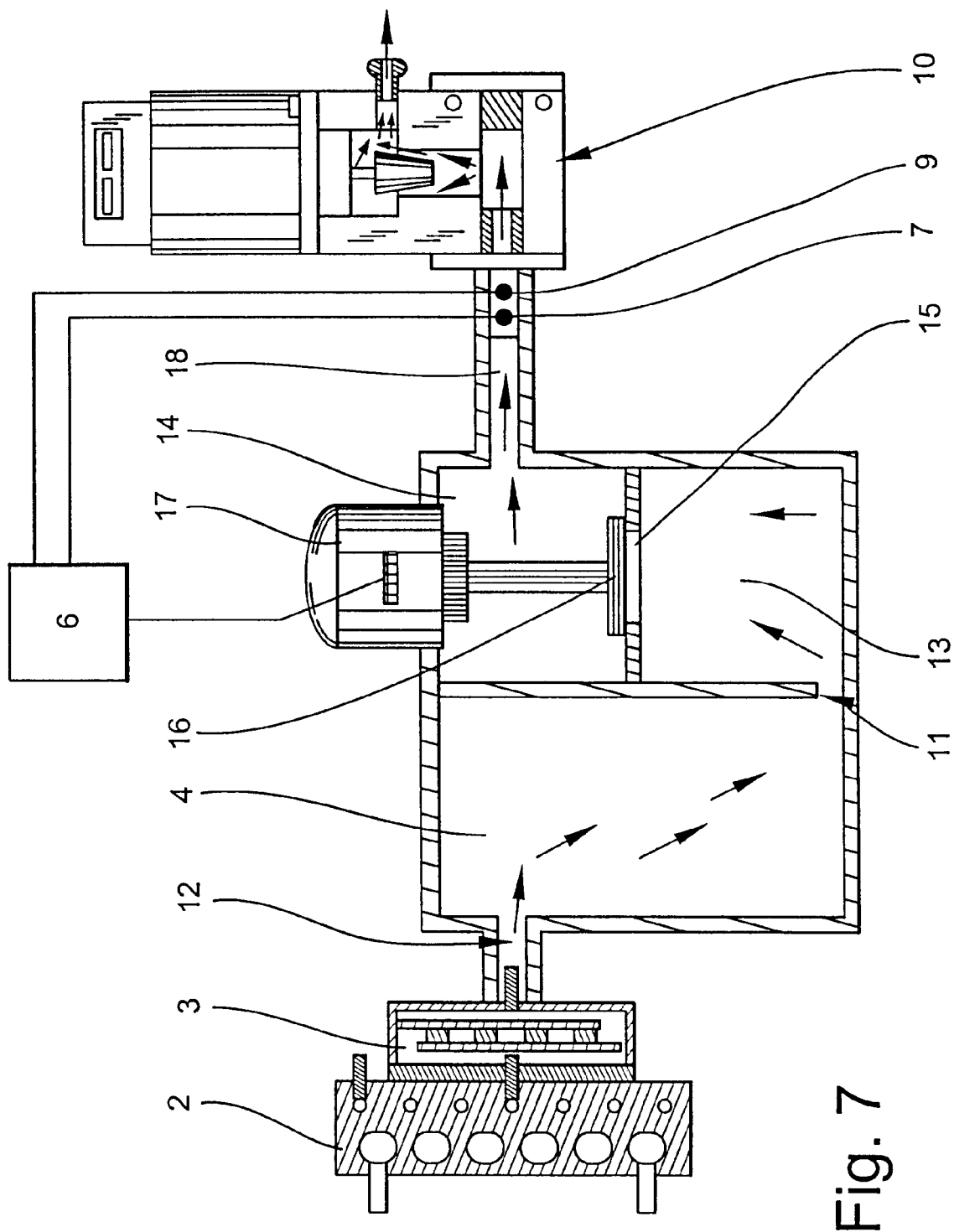
FIG. 7 shows the valve of FIG. 6 with the closing device in a second position.

The reducing valve 5 shown in FIGS. 6, 7 is connected to the fuel evaporation chamber 4 through a connecting orifice 11, while the evaporation chamber 4 is connected to the heat exchanger 2, 3 through an inlet orifice 12. The reducing valve 5 consists of two chambers 13, 14 separated by a passage section 15 for the superheated vapour; the flow through the passage section 15 is changed by a closing device 19 moved by a step motor 17 controlled by the central unit 6. The control central unit 6 defines the frequency and the amplitude of the displacement of the closing device 16 from a first position of maximum flow shown in FIG. 6 to a second position of null flow illustrated in FIG. 7 by changing the flow and the fuel pressure coming out of the valve 5 through an outlet orifice 18 connected to the metering valve 10.

Modifications in the configuration of the heat exchanger are possible; in a not shown embodiment the resistor stage 3 of the heat exchanger comprises a thermostat allowing the feeding of the resistors 28 when the cooling water temperature is lower than a pre-established value, said thermostat preventing the feeding when the water temperature is higher than said value; in this case, the fuel evaporation heat is delivered only by the water tube stage 2.

What is claimed:

1. An electronic pressure reducer for liquid petroleum gasses comprising a solenoid valve intercepting the liquid fuel, the solenoid valve being connected to a bottle housing the liquid fuel; a heat exchanger being located upstream of an evaporation chamber jointed to a pressure reducing valve in which the pressure of the evaporated fuel is regulated considering the engine working phases; the pressure reducing valve being controlled by a control central unit fitted with electronic components jointed to sensors; the control central unite defines the regulating process to be effected by the reducing valve according to the signals coming out of the sensors in order to obtain pre-established fuel pressure values at the outlet of the reducing valve, said values being stored in the control central unit, wherein the fuel pressure reducing valve comprises a variable hydraulic resistance mechanism and a passage section for the fuel in the state of superheated vapour.

2. An electronic pressure reducer as in claim 1, wherein the area of the passage section is changed by a closing device manoeuvred by an actuator controlled by the central unit.

3. Pressure reducer as in claim 1, wherein the reducing valve consists of two chambers separated by a passage section for the fuel in the state of superheated vapour; the area of the passage section is changed by a closing device manoeuvred by an actuator controlled by the central unit; the control central unit defining the displacement of the closing device from a first position of maximum flow to a second position of minimum flow by changing the area of the passage section, the dimension of which defines the flow and pressure of the fuel coming out the reducing valve through a outlet orifice connected to the metering valve.

4. Pressure reducer as in claim 1, wherein the pressure sensor measures the pressure in the engine intake manifold; according to the value of the signal of the pressure sensor, the control central unit processes an operative signal for the actuator of the pressure reducing valve in order to obtain a constant difference between the pressure in the intake manifold and the pressure at the outlet of the reducing valve.

5. Pressure reducer as in claim 1, wherein an absolute pressure sensor of the absolute pressure is situated at the outlet duct of the reducing valve; the absolute pressure sensor being jointed to the control central unit defining the displacement of the closing device by changing the area of the passage section according to the difference between the pressure measured by the absolute pressure sensor and a pressure reference value stored in the control central unit.

6. Pressure reducer as in claim 1, wherein the heat exchanger comprises two stages; a first stage consists of an exchanger in which the heat to be transmitted to the liquid fuel is supplied by the engine cooling water, while a second stage houses electrical resistors fed by the engine battery, the resistors transmitting the heat due to the Joule effect to the liquid fuel.

7. Pressure reducer as in claim 6, wherein the second stage of the heat exchanger consists of a series of resistors controlled by the central unit for transmitting an amount of heat to the fuel, said amount of heat gradually decreasing with the increase of the engine temperature measured by a temperature sensor situated at the outlet of the reducing valve.

8. Pressure reducer as in claim 6, wherein the second stage of the heat exchanger comprises a thermostat allowing the feeding of the resistors when the cooling water temperature is lower than a pre-established value, said thermostat preventing the feeding when the cooling water temperature is higher than said value; in this case, the fuel evaporation heat is delivered only by the water tube stage.

9. Pressure reducer as in claim 1, wherein the heat exchangers are planned for supplying an amount of heat to the fuel crossing the evaporation chamber and the pressure reducing valve in the state of superheated vapour, the amount of heat being sufficient to prevent condensation phenomena and eventual frosting in the throttling of the pressure reducing valve.

10. Pressure reducer as in claim 1, wherein the resistors of the stage of the heat exchanger are housed in a gasproof box so that the heat transmission to the fuel occurs in the absence of oxygen.

* * * * *